Feb. 14, 1967 L. O'NEAL 3,303,615
INFLATABLE DOCK SEAL
Filed Feb. 12, 1965 3 Sheets-Sheet 2
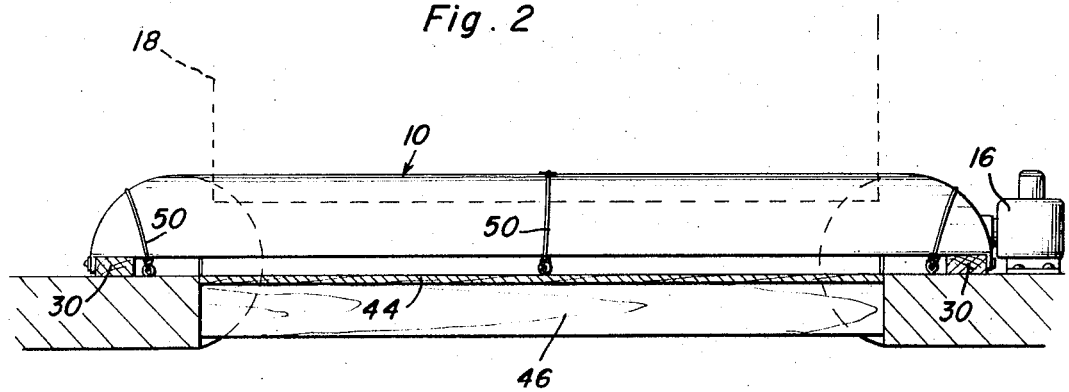
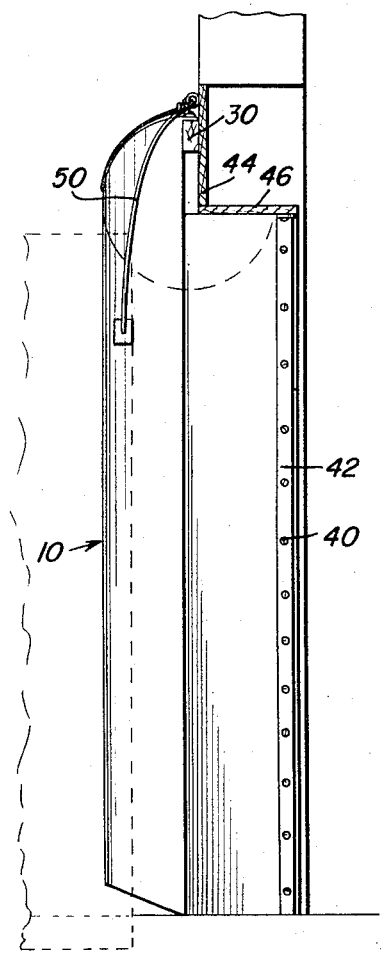
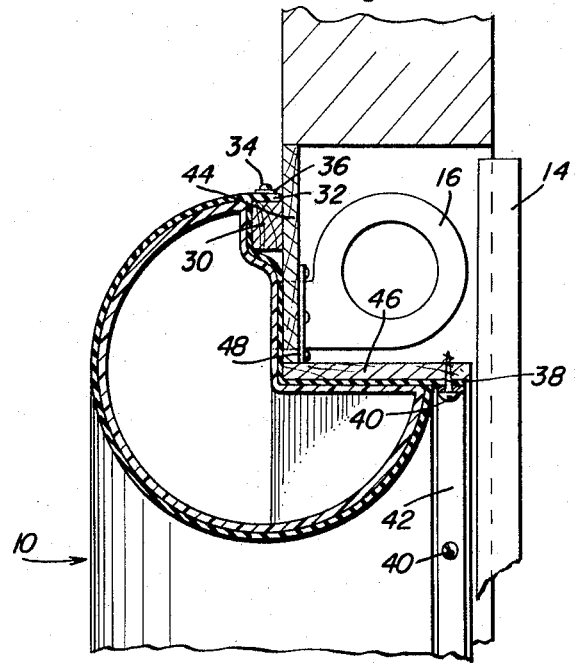
Larry O'Neal
INVENTOR.

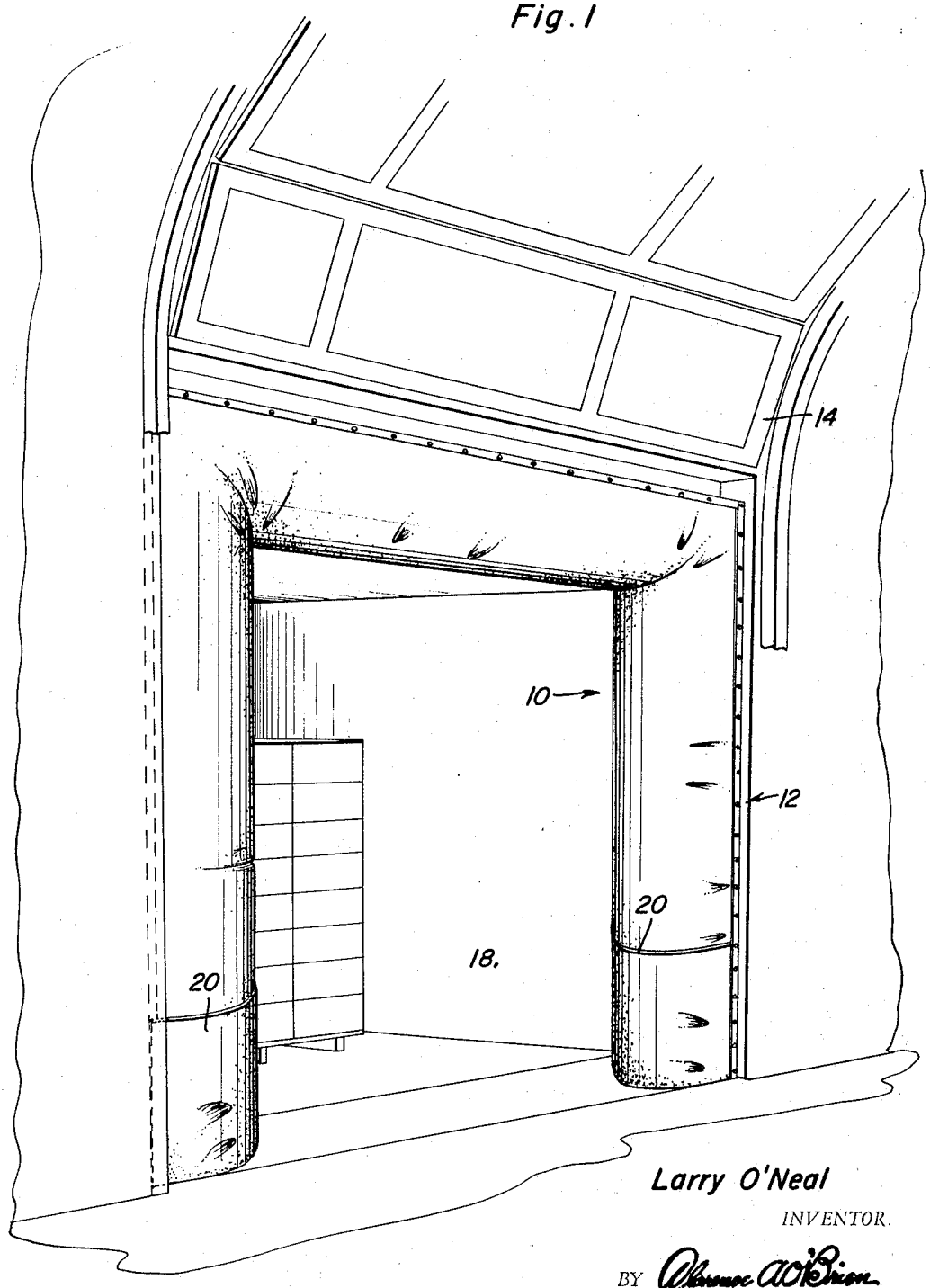

Feb. 14, 1967  L. O'NEAL  3,303,615
INFLATABLE DOCK SEAL
Filed Feb. 12, 1965  3 Sheets-Sheet 3

Larry O'Neal
INVENTOR.

BY *Clarence A. O'Brien*
and *Harvey B. Jackson*
Attorneys

United States Patent Office 3,303,615
Patented Feb. 14, 1967

3,303,615
INFLATABLE DOCK SEAL
Larry O'Neal, Youngstown, Ohio
(4953 Timbercrest Drive, Canfield, Ohio 44406)
Filed Feb. 12, 1965, Ser. No. 432,359
15 Claims. (Cl. 52—2)

The present invention is concerned with new and useful improvements in dock covers or shields and is more particularly concerned with a dock cover which forms a substantially air-tight seal between a building opening, such as for example a warehouse door, and a loading vehicle positioned adjacent thereto.

A significant object of the instant invention is to provide a dock seal which is mountable on a building in surrounding relation to the opening and which projects outwardly therefrom for resilient engagement with an adjacent vehicle.

In conjunction with the above object, it is a further object of the instant invention to provide a dock seal which is inflatable and, during periods of non-use, is capable of collapsing compactly against the building.

Likewise, it is a significant object of the instant invention to provide a dock cover which, through the inflated nature thereof, can accommodate a truck backing directly thereagainst, thereby insuring a tight sealing without danger to either the truck or the cover.

Also, it is a significant object of the instant invention to provide an inflatable dock cover wherein only a relatively low pressure is needed for inflation.

In addition, it is an object of the invention to provide for the use of a relatively tough flexible material in the formation of the cover with additional layers provided in the areas of most frequent contact.

Also, it is an object of the instant invention to incorporate various stabilizing straps or cords for assisting in properly positioning the dock cover or seal in either an expanded or collapsed position.

Furthermore, it is an object of the instant invention to provide an air inflatable dock cover which is provided with a constant source of air pressure in the form of a small blower, the cover itself being capable of maintaining its inflated condition even though accidentally punctured or torn, and similarly being easily repaired, this repair only requiring suitable glue and an air impervious material.

Another basic object of the instant invention is to provide a dock cover which, while capable of effectively providing a positive seal between the vehicle and building so as to allow for a loading and unloading therethrough while maintaining interior temperature and pressure controls, is relatively simple in construction and capable of being economically produced and operated.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a partial perspective view looking through a building opening, from the interior thereof, having the dock seal cover of the instant invention mounted therein;

FIGURE 2 is a top plan view, with portions broken away, illustrating the dock cover of FIGURE 1;

FIGURE 3 is a side elevational view, with portions broken away, illustrating the dock cover of FIGURE 1;

FIGURE 4 is an enlarged cross-sectional view through the horizontal top portion of the dock cover illustrating both one manner of modifying the building opening and a blower position differing from that of FIGURE 2;

Figure 5:
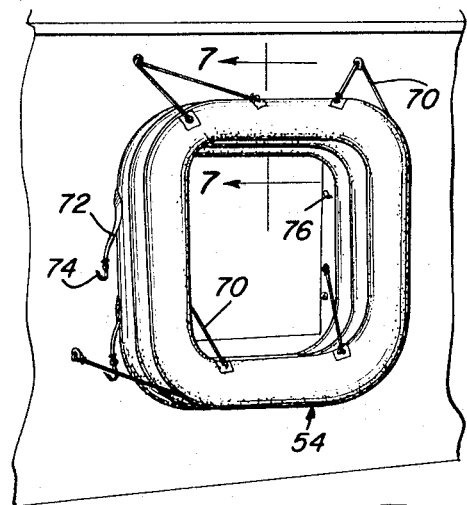
FIGURE 5 is a perspective view of a modified form of dock cover particularly adapted for use in conjunction with railroad cars.

Referring now more specifically to the drawings, reference numeral 10 is used to generally designate the dock cover of the instant invention. This dock cover or dock seal 10 is provided in surrounding relationship to a building opening 12, this opening generally being a warehouse door opening selectively closed by a conventional overhead door 14.

The cover 10 is to be inflated by means of a relatively small blower 16 which introduces a constant flow of air so as to maintain the inflation during periods of use. The material of the cover itself is of course air impervious, and is preferably neoprene coated nylon, such material having a high resistance to tears or rips. Further, due to the low pressure which will be needed to inflate the cover, the cover itself is capable of easily giving under pressure, such as by a truck backing into it, the air being forced back through the blower. It will be recognized that this ability of the inflated cover to give under pressure also assists in providing for a tight seal between the building and an adjacent vehicle, such a vehicle being generally indicated as a truck 18. Additional protection can be afforded to the cover 10 in those areas most likely to be damaged. For example, referring to FIGURE 1, it will be noted that additional plies of material 20 have been glued or otherwise secured to the lower portions of each of the vertical sides of the cover 10, these additional plies 20 extending a substantial distance upward and protecting the cover 10 from the various pallets, lift forks, etc. which will be passing thereby.

The cover 10 is formed, in effect, as a single elongated tubular member angled so as to conform to both the opposed vertical sides of a door opening 12 and the horizontal top thereof. Although the cover 10 could also be extended horizontally below the door opening 12, this is not normally considered necessary in that a loading apron will be provided for movement of the loads between the building and vehicle.

The tubular member which forms the cover 10 is to preferably enclose the corner formed by the exterior wall 22 of the building and the side wall 24 of the opening 12. Accordingly, the tubular or hollow cylindrical cover 10 is formed with a full length right angular or segmental recess therein defined by a pair of right angularly related panels 26 and 28.

In order to mount the cover 10, framing members 30, generally 2 by 4's, are fixed to the exterior of the building in outwardly spaced relation to the sides and top of the door opening 12 a distance generally equal to the width of the cover panel 26. An integral full length mounting flap 32 extends from the circular portion of the cover 10 and projects generally perpendicularly beyond the cover panel 26. This mounting flap 32 is engaged directly against the outer edge of the members 30 and is fixed thereto by means of either screws or nails 34, a full length steel strip 36 overlying the mounting flap 32 and of course having pre-drilled holes therein. In this manner, it will be appreciated that one longitudinal edge of the cover 10 is positively fixed, and in fact sealed, to the exterior surface of the building wall both along the sides and across the top of the door opening 12.

The other longitudinal edge of the cover 10, formed by the right angular recess, is also provided with an integral mounting flap 38, the flap 38 projecting longitudinally from the panel 28 beyond the adjoining end of the circular portion of the cover 10 and being affixed to the adjoining surfaces of the door opening 12 itself by means of driven fasteners 40 extending through full length steel strips or straps 42 which in turn bear directly against the mounting flaps 38.

In order to properly locate the cover 10 for sealing engagement with the vehicle about the discharging opening therein, it may be necessary to modify the building opening 12, this modification generally consisting of a lowering of the top thereof. In such a situation, elongated vertically and horizontally orientated blocking panels 44 and 46 can be mounted within the building opening 12 so as to reduce the effective size of the opening 12. It will of course be appreciated that these blocking panels 44 and 46 are rigidified and braced so as to form in effect an integral part of the building upon which the framing members 30 can be directly mounted, as well as to which the mounting flaps 32 and 38 can be affixed in a sealed manner. With reference specifically to FIGURE 4, it will be noted that the use of the blocking panels 44 and 46 provides a convenient inwardly opening compartment which can easily accommodate the motor and blower 16 which, in one embodiment, will be mounted directly on the vertically orientated blocking panel 44, through the mounting flange 48, and communicated directly with the inflatable cover 10 therethrough.

If deemed necessary in order to prevent an excessive sagging of the cover or sealing member 10, especially when collapsed, a plurality of suspension straps or cords 50 may be provided, these straps 50 having one end engaged in a suitable manner with a portion of the cover 10 and the other end fixed directly to the building wall.

Figure 9:
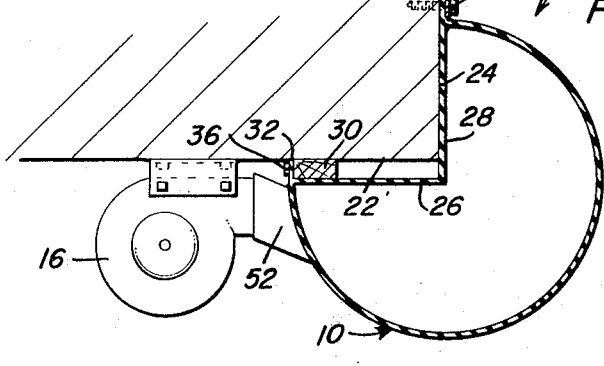
FIGURE 9 is a horizontal cross-sectional view through one of the vertical side portions of the cover of FIGURE 1 illustrating further details thereof.

Incidentally, while the compartment formed by the panels 44 and 46 provides a convenient location for the blower 16, as will be appreciated from FIGURES 2 and 9, the blower 16 can alternatively be mounted on the exterior of the building and communicated with the cover 10 through an air impervious sleeve 52.

Referring now specifically to FIGURES 5–8, it will be noted that a modified form of dock cover 54 has been illustrated therein. The dock cover 54 is particularly intended for use in conjunction with railroad cars, generally indicated by reference numeral 56 in FIGURE 7, and as such, projects outwardly from the building wall a substantially greater distance than the cover 10. The railroad siding dock cover 54 is constructed of the same material as the cover 10 and is similarly inflated by means of a low pressure blower 58, the inflation of the cover 54 normally being done subsequent to a positioning of the railroad car 56 adjacent the building inasmuch as the outer end of the cover 54 will be engaged with the side of the railroad car 56 rather than an end thereof such as would be the case with a truck.

The cover 54 itself is generally rectangular in cross-section and includes, in addition to an inner end panel 60 engaged against the building wall and an outer end panel 62 engaged against a railroad car 56, a plurality of full length partitions or partition panels 64 dividing the cover 54 into three full lengths transversely adjacent compartments 66. The blower 58 is communicated with only one of the compartments 66 with the air being introduced into the remaining compartments by means of relatively small openings or air passages 68 in the interior partitions or panels 64. It is through this construction that a highly stable inflatable cover can be provided in spite of the relatively great distance the outer portion thereof must be, in effect, cantilevered outward from the building. In addition, the provision of the relatively small air holes or passages 68 between the compartments 66, these passages 68 being positioned in spaced relation along the full length of the partitions 64, tend to insure that a complete collapsing of the cover 54 will not occur no matter how badly the outermost compartment 66 is damaged, the outermost compartment 66 of course being the one most likely to receive tears due to its engagement with the side of the railroad car.

Figure 7:
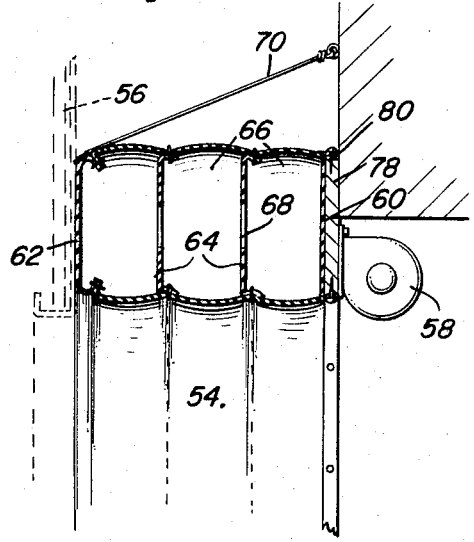
FIGURE 7 is an enlarged cross-sectional view taken substantially on a plane passing along line 7—7 in FIGURE 5.
Figure 6:
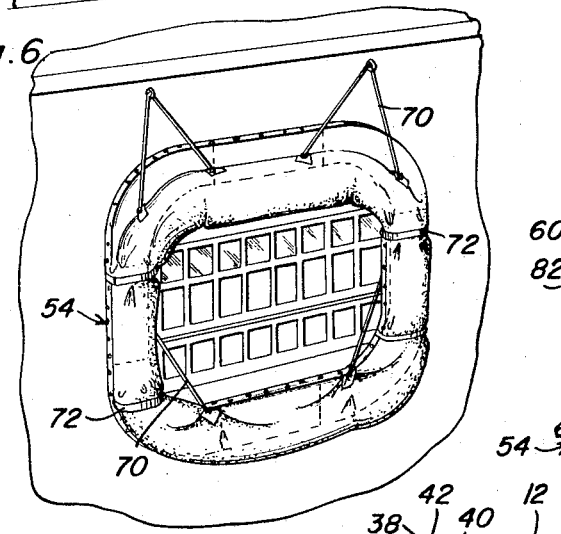
FIGURE 6 is a perspective view of the dock cover of FIGURE 5 in collapsed position.

In addition to the rigidity introduced into the cover 54 by the partitions 64, these partitions 64 in effect dividing the cover 54 into three adjacent integral hollow tubes, the cover 54 is provided with suspension straps or cords 70 having a limited degree of elasticity and being engaged in any suitable manner between the building and the outer end of the cover 54 as best seen in FIGURES 5–7. As will be recognized by a comparison of FIGURES 5 and 6, the straps 70, in addition to stabilizing and assisting in the support of the inflated cover 54, also prevent undue sagging of the collapsed cover 54 so as to avoid an obstruction of the door opening. Likewise, due to the relatively great depth of the cover 54, a plurality of tie straps 72 are provided for engagement about portions of the collapsed cover 54 so as to directly clamp or tie the collapsed cover 54 to the building. These tie straps 72 are of course releasable, each strap generally having a hook 74 on the outer or free end thereof which is releasably engaged within a suitable eye 76, the inner end of the strap 72 either being similarly releasably mounted, or if desired, permanently affixed to the building.

As will be appreciated from FIGURES 5 and 6, the cover 54 is to preferably completely surround the building opening. The actual mounting of the cover 54 on the exterior of the building in surrounding relation to the door opening therein is achieved through a frame comprising elongated mounting panels 78 fixed to the exterior of the building and of a width generally equal to the width of the cover 54.

The inner end of the cover 54 is provided with a pair of rearwardly projecting full length mounting flaps 80 which are positioned against the opposite longitudinal edges of the mounting panels 78 and fixedly secured thereto by driven fasteners in conjunction with pre-drilled steel strips extending along the full length thereof.

Figure 8:
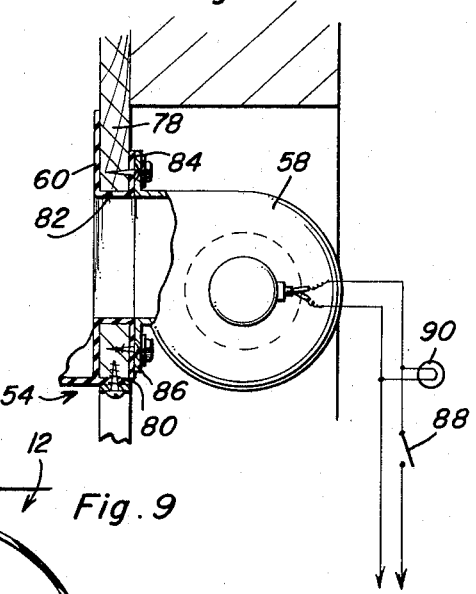
FIGURE 8 is an enlarged detailed view of the blower mounting.

With reference to FIGURES 7 and 8, it will be appreciated that any necessity of reducing the size of the door opening can be accommodated by merely projecting the corresponding mounting panel or panels 78 thereover with the inwardly projecting portion of the panel 78 providing a convenient location for a mounting of the blower 58. Under such circumstances, the discharge end of the blower 58 is engaged against the inner surface of the mounting panel 78 about an air flow opening 82 therein, the inner end wall 60 of the cover 54 having a corresponding aperture therein along with reversely folded securing flaps 84 overlying the inner surface of the mounting panel 78 and secured thereto both by separate driven fasteners and through a clamping thereof effected by the mounting flange 86 of the blower 58. Incidentally, the blower 58, as well as the previously referred to blower 16, is to be preferably controlled through a remotely located switch 88 with a pilot or indicating light 90 being provided so as to provide a constant indication that the blower is operating.

From the foregoing, it will be appreciated that two forms of a highly novel dock cover have been defined. This dock cover, through the inflatable nature thereof, provides a positive and substantially air-tight seal between a building and an adjacent vehicle so as to enable a maintaining of a constant temperature, pressure, etc., condition within the building during both a loading and unloading of the vehicle. In addition, the resilient inflated nature of the cover enables the cover to accommodate itself to the exterior of the vehicle, thereby effectively increasing the seal therebetween. With regard to the form of dock cover specifically adapted for use in conjunction with railroad cars, it has been noted that the provision of internal partitions results in the production of a unit which can be cantilevered relatively great distances outward from the building wall upon which it is mounted. Similarly, the cylindrical shape of the other form of cover is considered to provide for a substantial degree of stability upon being inflated.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. For engagement with a building wall about an opening therein, an inflatable dock cover, said cover being generally in the form of a hollow elongated cylinder positionable about a major portion of the border of the opening, said cylinder having a longitudinally extending lateral recess defined therein, said recess defining a pair of right angularly related panels engageable against the inner faces of the opening and one adjacent wall surface so as to enclose the corner defined therebetween.

2. The structure of claim 1 including an integral mounting flap projecting outwardly from the juncture of each of said panels with the surface of the cylinder for the reception of driven fasteners therethrough for mounting the cover on a building wall.

3. The structure of claim 1 including a plurality of elongated suspension straps having first ends thereof fixed to said cover and the second ends thereof projecting therefrom for engagement with a building wall laterally outward of the periphery of the cover.

4. For engagement with a building wall about an opening therein, an elongated inflatable dock cover generally rectangular in shape so as to define an endless interior, said cover being generally rectangular in cross-section and including continuous inner and outer end panels, a plurality of elongated transversely orientated partitions generally paralleling said end panels and dividing said endless interior into a plurality of adjacent endless compartments, means for introducing forced air into one of said compartments, and means for communicating the interiors of the compartments with the interior of the adjacent compartments.

5. In combination, a building wall having opposed faces and an opening defined therethrough, a frame secured to one of said faces and extending about at least a major portion of said opening, said frame defining an outer side edge lying in a plane that extends outwardly from said one face, an elongated inflatable dock cover positioned over the frame on said one face and extending from the outer side edge thereof toward the opening, an integral mounting flap on the outer side edge of the cover, said flap overlying the outer side edge of the frame, and means securing the flap to the frame edge.

6. The structure of claim 5 wherein said means consists of an elongated strip overlying said flap, and a plurality of driven fasteners extending through the strip and flap.

7. The structure of claim 5 wherein said frame also defines an inner side edge lying in a plane that extends outwardly from said one face, an integral mounting flap on the inner side edge of the cover, said inner side edge flap overlying the inner side edge of the frame, and means securing the inner edge flap to the inner frame edge.

8. The structure of claim 5 including an elongated rigid panel extending along a side of said opening generally in the plane of said one face, said panel projecting laterally across a portion of the opening so as to reduce the effective area thereof, said cover overlying the panel, a blower mounted on the opposite face of said panel from the cover, and means communicating said blower with said cover through said panel.

9. The structure of claim 5 including an air blower mounted on said one face of said wall outward of said frame, and an elongated air impervious sleeve extending between and directly communicating the blower with the cover.

10. The structure of claim 5 wherein said cover includes a plurality of full length compartments, said compartments being positioned adjacent each other transversely across the cover, full length partitions separating adjoining compartments, and limited air flow openings through the partitions so as to allow a flow of air into all the compartments from a common source.

11. In combination, a wall having opposed faces and an opening defined therethrough, frame means secured to one of said faces and extending about at least a major portion of said opening, said frame means defining an outer side edge lying in a plane that extends outwardly from said one face, an elongated inflatable dock cover positioned over the frame means on said one face and extending from generally the outer side edge thereof toward the opening, an integral mounting flap on the outer side edge of the cover, and means securing the flap to the frame means at the outer side edge.

12. The structure of claim 11 wherein said frame means also defines an inner side edge lying in a plane that extends outwardly from said one face, an integral mounting flap on the inner side edge of the cover, said inner side edge flap overlying the inner side edge of the frame means, and means securing the inner edge flap to the inner side edge of the frame means.

13. The structure of claim 11 wherein said inflatable dock cover is generally rectangular in shape so as to define an endless interior, said cover being generally rectangular in cross-section and including continuous inner and outer end panels, a plurality of elongated transversely orientated partitions generally paralleling said end panels and dividing said endless interior into a plurality of adjacent endless compartments, means for introducing forced air into one of said compartments, and means for communicating the interiors of the compartments with the interior of the adjacent compartments.

14. The structure of claim 13 including a pair of generally perpendicularly directed mounting flaps integral with the inner end panel along the opposite edges thereof.

15. For engagement with a building wall about an opening therein, an inflatable dock cover, said cover being in the form of a hollow elongated member positionable about a major portion of the opening, said member having a longitudinally extending lateral recess defined therein, said recess comprising a pair of generally right angularly related panels engageable against the inner faces of the opening and one adjacent wall surface so as to enclose the corner defined therebetween.

References Cited by the Examiner

UNITED STATES PATENTS

| 511,472 | 12/1893 | Sumovski | 52—2 |
|---|---|---|---|
| 691,118 | 1/1902 | Curlin. | |
| 1,620,933 | 3/1927 | Wilcox | 52—173 X |
| 2,634,589 | 4/1953 | Wilson et al. | |
| 2,682,274 | 6/1954 | Miller | 52—2 |
| 2,718,014 | 9/1955 | Mizrach et al. | 52—2 X |
| 2,731,055 | 1/1956 | Smith | 52—2 |
| 2,910,994 | 11/1959 | Joy | 52—2 |
| 2,939,467 | 6/1960 | Meyer et al. | 52—2 |
| 3,126,048 | 3/1964 | Hollands. | |

REINALDO P. MACHADO, *Primary Examiner.*

HARRISON R. MOSELEY, *Examiner.*

W. E. HEATON, *Assistant Examiner.*